(12) United States Patent
Crombez

(10) Patent No.: US 7,410,023 B2
(45) Date of Patent: Aug. 12, 2008

(54) SYSTEM AND METHOD FOR BRAKING A VEHICLE

(75) Inventor: Dale Crombez, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 218 days.

(21) Appl. No.: 11/161,404

(22) Filed: Aug. 2, 2005

(65) Prior Publication Data

US 2006/0021810 A1 Feb. 2, 2006

Related U.S. Application Data

(60) Provisional application No. 60/598,008, filed on Aug. 2, 2004.

(51) Int. Cl.
*B60K 28/16* (2006.01)

(52) U.S. Cl. ............... 180/197; 180/370; 180/170; 180/65.3

(58) Field of Classification Search .............. 180/65.1, 180/65.2, 65.3, 65.8, 370, 325, 170, 197; 303/152, 122.06, 154; 701/54, 51, 65, 71; 477/4, 183, 29
See application file for complete search history.

(56) References Cited

U.S. PATENT DOCUMENTS

| | | | |
|---|---|---|---|
| 3,802,528 A | 4/1974 | Liber | |
| 4,913,270 A | 4/1990 | Ishido et al. | |
| 4,934,497 A | 6/1990 | Ishizeki et al. | |
| 4,971,164 A | 11/1990 | Fujita et al. | |
| 5,077,672 A | 12/1991 | Nobumoto et al. | |
| 5,127,501 A | 7/1992 | Arikawa | |
| 5,291,960 A * | 3/1994 | Brandenburg et al. | 180/65.2 |
| 5,527,235 A | 6/1996 | Kuroda et al. | |
| 5,586,953 A | 12/1996 | Abo | |
| 5,618,084 A | 4/1997 | Reiner | |
| 5,741,051 A | 4/1998 | Nakashima et al. | |
| 5,788,597 A | 8/1998 | Boll et al. | |
| 5,839,533 A * | 11/1998 | Mikami et al. | 180/165 |
| 5,915,801 A * | 6/1999 | Taga et al. | 303/152 |
| 6,099,089 A * | 8/2000 | Schneider | 303/152 |
| 6,122,585 A * | 9/2000 | Ono et al. | 701/71 |
| 6,122,588 A * | 9/2000 | Shehan et al. | 180/167 |

(Continued)

FOREIGN PATENT DOCUMENTS

EP 0 926 030 A2 6/1999

(Continued)

OTHER PUBLICATIONS

Search Report under Section 17, Application No. GB0515105.5; Oct. 11, 2005.

*Primary Examiner*—Hau V Phan
(74) *Attorney, Agent, or Firm*—David B. Kelley; Brooks Kushman P.C.

(57) ABSTRACT

A system and method is provided for braking a vehicle having multiple wheels. The method includes applying friction braking and powertrain braking to the vehicle. The method includes reducing the powertrain braking by a predetermined amount. The method also includes compensating the friction braking in an amount that is substantially the same as the predetermined amount. The method further includes redistributing the friction braking to the multiple wheels and modulating the friction braking being applied to the multiple wheels, thereby reducing the occurrence of a wheel lockup by the multiple wheels.

20 Claims, 3 Drawing Sheets

U.S. PATENT DOCUMENTS

| | | |
|---|---|---|
| 6,278,916 B1 | 8/2001 | Crombez |
| 6,588,860 B2 | 7/2003 | Kosik et al. |
| 6,625,535 B2 * | 9/2003 | Han et al. ............ 701/65 |
| 6,681,169 B2 | 1/2004 | Billig et al. |
| 6,687,593 B1 | 2/2004 | Crombez et al. |
| 6,842,685 B2 | 1/2005 | Belvo et al. |
| 6,862,511 B1 * | 3/2005 | Phillips et al. ............ 701/54 |
| 6,907,337 B2 * | 6/2005 | Phillips et al. ............ 701/51 |
| 6,915,198 B2 * | 7/2005 | Phillips et al. ............ 701/54 |
| 7,001,306 B2 * | 2/2006 | Suzuki ............ 477/4 |
| 7,163,487 B2 * | 1/2007 | Tao et al. ............ 477/3 |
| 2002/0024255 A1 | 2/2002 | Schmitt et al. |
| 2002/0116101 A1 | 8/2002 | Hashiba et al. |
| 2003/0098185 A1 * | 5/2003 | Komeda et al. ............ 180/65.2 |
| 2005/0151420 A1 * | 7/2005 | Crombez et al. ............ 303/152 |

FOREIGN PATENT DOCUMENTS

| | | |
|---|---|---|
| EP | 0 896 895 B1 | 11/2001 |
| EP | 1 431 149 A1 | 6/2004 |
| GB | 2 411 446 A | 8/2005 |
| JP | 04151354 A | 5/1992 |
| JP | 2000-025491 A | 1/2000 |

* cited by examiner

SYSTEM AND METHOD FOR BRAKING A VEHICLE

CROSS-REFERENCE TO RELATED APPLICATIONS

This application claims the benefit of U.S. provisional application Ser. No. 60/598,008, filed Aug. 2, 2004, entitled "IMPROVED ABS PERFORMANCE WITH BRAKE-BY-WIRE ON LOW MU," the entire contents of which is hereby incorporated by reference.

TECHNICAL FIELD

The present invention relates to a system and method for braking a vehicle.

BACKGROUND

Powertrain braking (also referred to as compression or engine braking) occurs when a powertrain of a vehicle delivers a braking torque (or force) that causes the vehicle to decelerate. Powertrain braking is typically produced as a result of the engine's compression losses during high engine revolutions per minute (RPM) and a low throttle position. It is well known that the amount of powertrain braking produced can cause the wheels of the vehicle to lockup on low friction surfaces, which is undesirable for a vehicle operator. Additionally, the conventional powertrain and friction braking systems lack efficient control and distribution of the powertrain braking produced to significantly reduce the occurrence of wheel lockup events.

The present invention was conceived in view of these and other disadvantages of conventional powertrain and friction braking systems.

SUMMARY

The present invention provides a system and method for improved braking of a vehicle. A method of braking a vehicle is disclosed wherein the vehicle has multiple wheels and the vehicle is configured to apply friction braking and powertrain braking to the vehicle. The method includes reducing the powertrain braking by a predetermined amount. The method also includes compensating the friction braking in an amount that is substantially the same as the predetermined amount. In one aspect, compensation of the friction braking occurs by adding braking torque to the friction braking. The method further includes redistributing the compensated friction braking to the wheels and modulating the friction braking being applied to the wheels thereby reducing the occurrence of a wheel lockup. In one embodiment, the friction braking is redistributed to a vehicle having four wheels. In such an embodiment, redistributing the braking force to four wheels enables improved removal of one or more of the vehicle wheels from a lockup state.

The braking system includes a powertrain configured to apply powertrain braking to the vehicle and a friction braking system for applying friction braking to the vehicle. The braking system also includes a controller operable with the powertrain for reducing the powertrain braking by a predetermined amount. The braking system further includes a braking module integrated with the friction braking system and operable with the controller for compensating the friction braking in an amount that is substantially the same as the predetermined amount and for redistributing the friction braking among the vehicle wheels and modulating the friction braking being applied to the wheels, thereby reducing the occurrence of a wheel lockup.

BRIEF DESCRIPTION OF THE DRAWINGS

These and other features and advantages of the invention will be apparent from the following detailed description and the appended claims, taken in conjunction with the accompanying drawings, in which:

DETAILED DESCRIPTION

By way of example, a system and methodology for implementing the present invention is described below. The system and methodology may be adapted, modified or rearranged to best-fit a particular implementation without departing from the scope of the present invention.

Figure 1A:
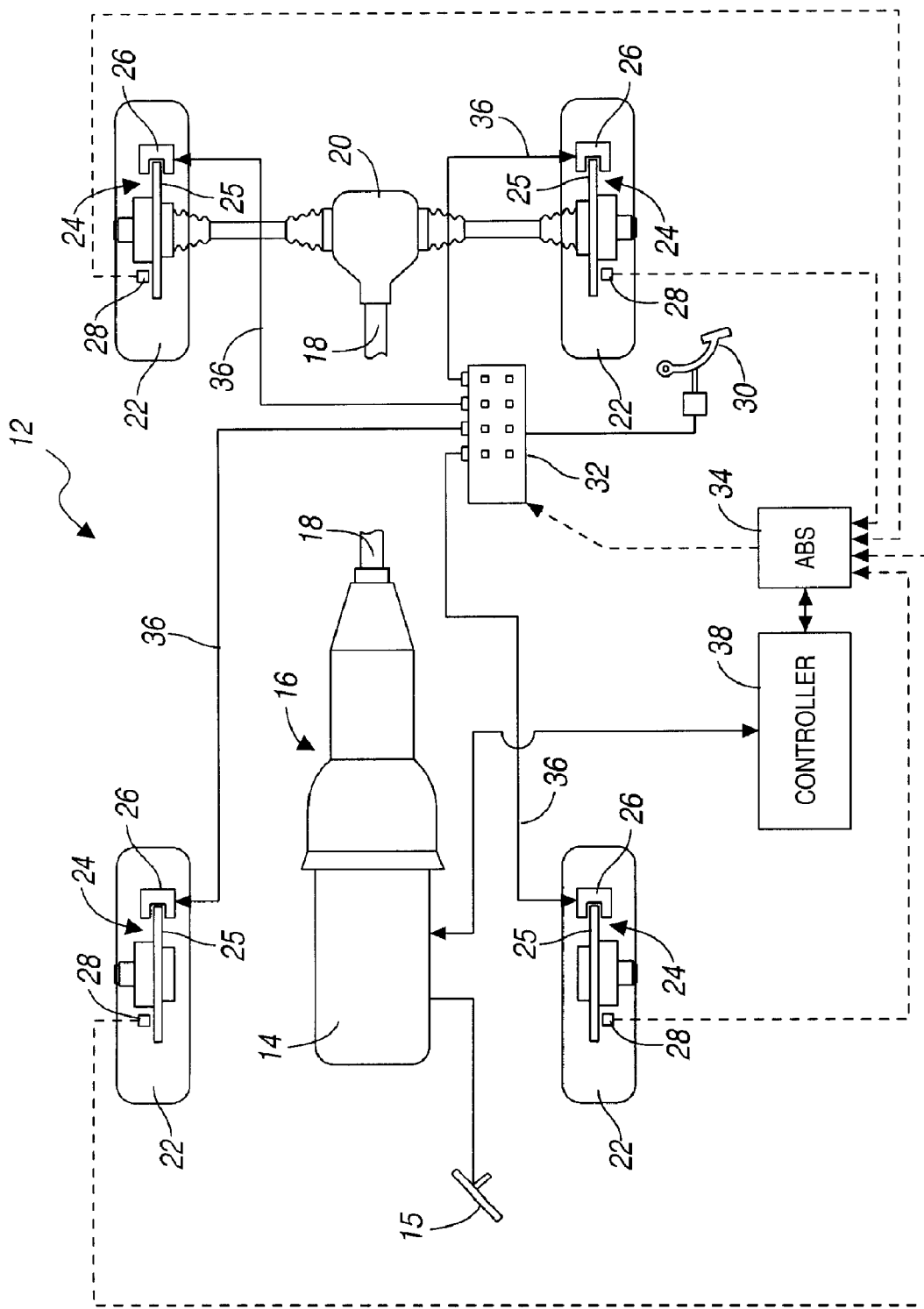
FIGS. 1A and 1B illustrate system diagrams of a vehicle that is configured to apply friction braking and powertrain braking to a vehicle in accordance with an embodiment of the present invention.

Referring to FIG. 1, a vehicle 12 is illustrated that enables monitoring and compensation of powertrain braking and friction braking for improved vehicle steerability and stability. Vehicle 12 includes a powertrain having an engine 14, a transmission 16 and a drive shaft 18. As recognized by one of ordinary skill in the art, engine 14 responds to a vehicle operator request to decelerate or accelerate vehicle 12 through the use of an accelerator pedal 15. Accordingly, vehicle operator request includes both an acceleration and a deceleration request. The acceleration request occurs when a vehicle operator applies force to accelerator pedal 15 to accelerate. The deceleration request occurs when the vehicle operator does not apply force to accelerator pedal 15 or applies an amount of force (i.e., typically a minimal amount of force while the vehicle is in motion) to accelerator pedal 15 so as to cause vehicle 12 to decelerate.

Drive shaft 18 mechanically couples transmission 16 to a differential 20. Differential 20 is mechanically coupled to wheels 22 thereby enabling movement of vehicle 12 in response to motive force from engine 14. As shown, vehicle 12 further includes friction brakes 24. Brakes 24 include a brake disc 25, a caliper 26, and a speed sensor 28 that communicates with an anti-lock braking system (ABS) module 34. Caliper 26 is operable with brake disc 25 for slowing and/or stopping vehicle 12. ABS module 34 is operable with a pressure adjustment unit 32. In response to a brake request from a brake pedal 30, pressure adjustment unit 32 is configured to enable proper distribution of braking fluid to brakes 24 through the use of liquid pressure passages 36. Although the embodiment shown in FIG. 1 illustrates a braking system that utilizes hydraulics, it is recognized that the friction braking system of FIG. 1 may be a pure brake-by-wire (BBW) system, an electromechanical braking system or a hydro-mechanical braking system without departing from the scope of the present invention. In either embodiment, controller 38 is operable with ABS module 34 and engine 14 for monitoring and controlling the performance of engine 14.

Figure 1B:
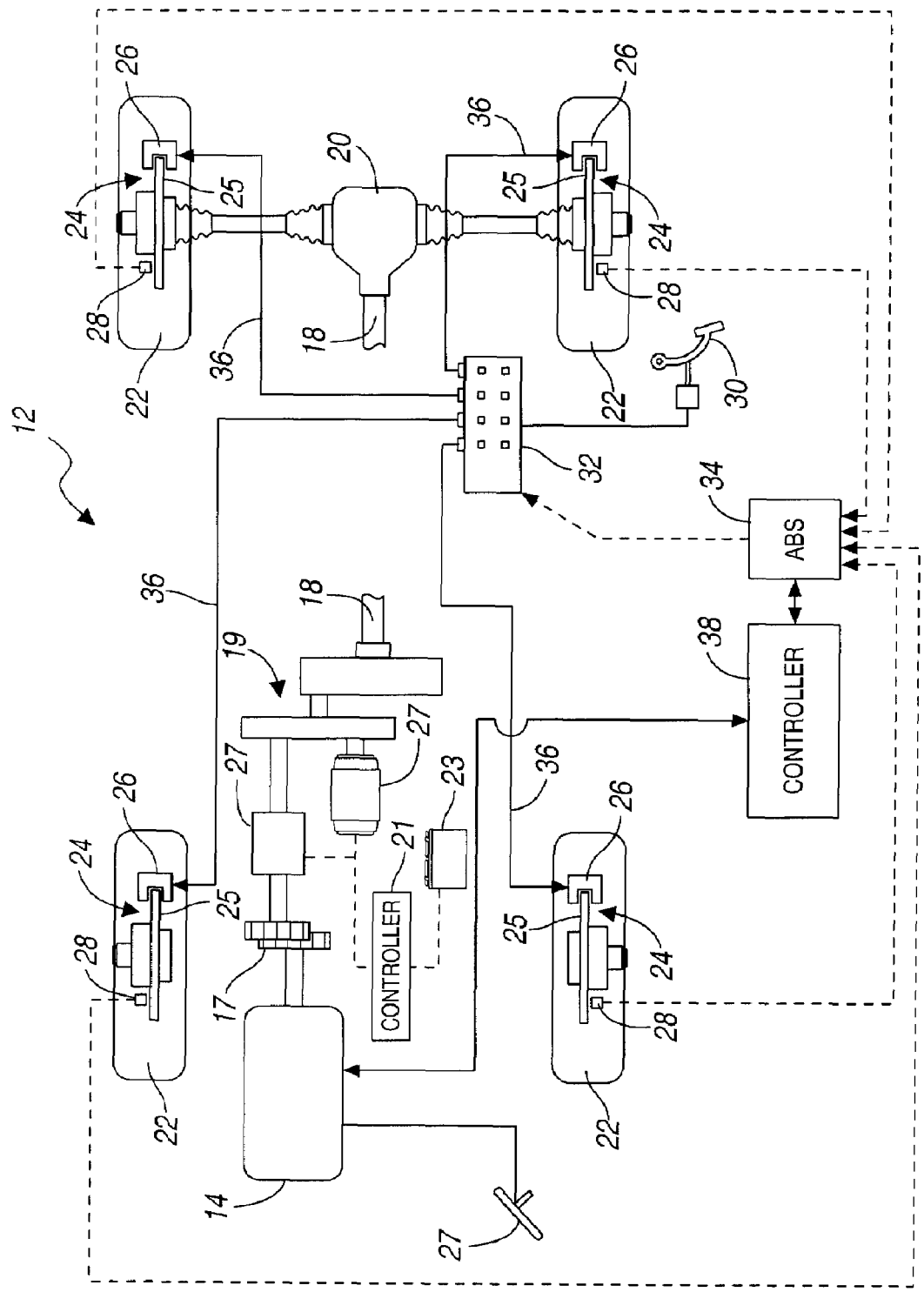

Engine 14 is adapted to apply a powertrain braking to vehicle 12. Additionally, powertrain braking may result from any device located on vehicle 12 that is capable of delivering an acceleration or deceleration torque (or force) as commanded by the accelerator pedal. Referring to FIG. 1B, a hybrid-electric vehicle (HEV) embodiment of vehicle 12 is shown having a motor/generator 27. Motor/generator 27 is configured to deliver an acceleration or deceleration torque to vehicle 12. A planetary gear set 17 and a second gear set 19 coupled to motor/generator 27 further enable the delivery of the acceleration or deceleration torque. Additionally, a controller 21 is configured to generate control signals for motor/generator 27. A battery 23 is configured to provide power to vehicle 12 and receive an electrical charge from motor/generator 27. Accordingly, in a HEV embodiment of vehicle 12 as shown in FIG. 1B, powertrain braking may be delivered by HEV motor/generator 27 or engine 14. In the case of a fuel-cell electric vehicle (FCEV) embodiment of vehicle 12, powertrain braking may be delivered by a FCEV motor.

Nevertheless, in one aspect, the powertrain braking may be applied in response to a deceleration request from the vehicle operator. It is recognized that the powertrain braking applied to vehicle 12 may be of a magnitude that causes wheels 22 to experience a lockup. It is also recognized that powertrain braking may occur as a result of the vehicle operator placing transmission 16 into a lower gear ratio. In conventional vehicles, the powertrain braking is applied to those wheels that are directly coupled to the powertrain of the vehicle (e.g., the set of wheels mechanically coupled to the engine via the transmission). According to one aspect of the present invention, friction brakes 24, controller 38 and ABS module 34 enable redistribution of the powertrain braking to all four wheels of vehicle 12. Additionally, ABS module 34 enables modulation of the friction braking applied to wheels 22.

Figure 2:
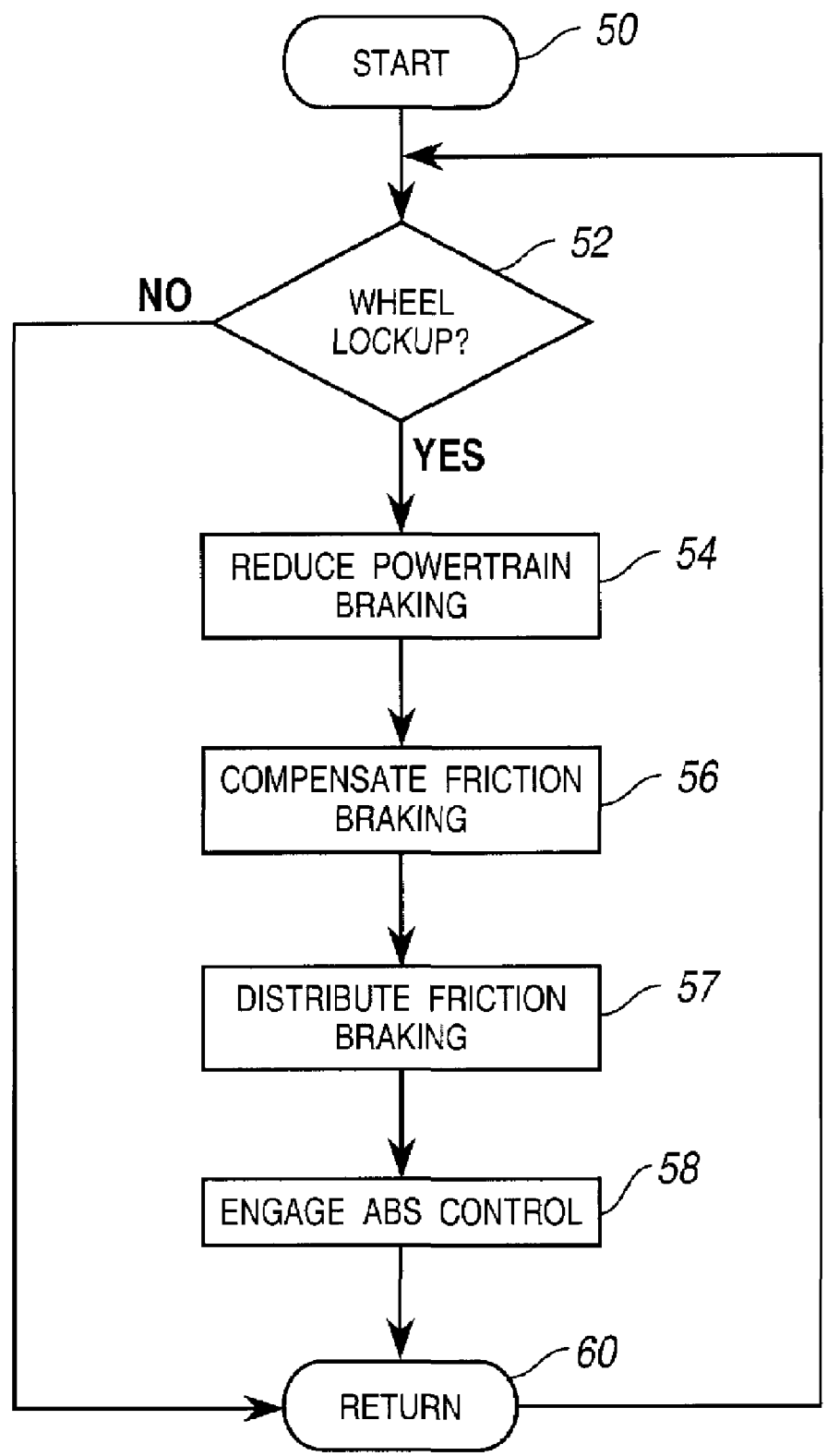
FIG. 2 illustrates a flow diagram of a method for compensating a friction braking system for improved steerability and vehicle stability in accordance with an embodiment of the present invention.

Now referring to FIG. 2, a flow diagram illustrates a method for braking a vehicle having powertrain and friction braking functionality, in the event of a wheel lockup. Accordingly, block 50 is an entry point to the method. At block 52, the method determines whether a wheel lockup event has or is occurring. As such, ABS module 34 and speed sensors 28 enable determination of the wheel lockup event. If there is no wheel lockup event, the method proceeds to block 60 wherein the method returns to block 52. When the method determines that there is a wheel lockup event, the powertrain braking applied by engine 14 is reduced by a predetermined amount.

Controller 38 is configured to monitor the amount of powertrain braking being applied by engine 14. Controller 38 is further configured to determine, based on various parameters such as vehicle speed and engine RPM, the amount of powertrain braking that causes a wheel lockup event to occur. Accordingly, the reduction in powertrain braking is of a sufficient magnitude to reduce the occurrence of a wheel lockup event. Thus, based on the various vehicle parameters, controller 38 generates signals for engine 14 to reduce the amount of powertrain braking created. Alternatively, the powertrain braking may be reduced by mechanically decoupling the powertrain from wheels 22. In the case of an HEV or FCEV vehicle, powertrain braking may be reduced in response to controller 38 generating signals for the HEV or FCEV electric motor that cause the electric motor to reduce the amount of powertrain braking force being applied to the vehicle powertrain. As described above, powertrain braking may be produced by any powertrain device such as engine 14 and alternatively, an electric motor, in the case of HEV or FCEV vehicles. In one aspect of the invention, the HEV and FCEV vehicle typically include a controller configured to generate signals that cause the electric motor and/or the internal combustion engine to apply a powertrain braking force to the vehicle. It is recognized that the powertrain braking force may be applied independent of inputs from the vehicle operator.

As described above, controller 38 communicates with ABS module 34 to compensate the friction braking being applied to wheels 22. In one embodiment, compensation of friction braking occurs by adding braking torque to the friction braking in an amount that is substantially the same as the predetermined amount of powertrain braking reduced in block 54. In the case of an HEV or FCEV vehicle, braking torque may be added by controller 38 generating signals via ABS module 34 for the friction braking system to increase the amount of braking force (or torque) being applied to the wheels 22. As such, in one aspect of the invention, the vehicle operator generates a braking request by depressing brake pedal 30. Accordingly, the friction braking applied by brakes 24, in response to the braking request, is compensated to improve vehicle braking and reduce occurrence of the lockup by wheels 22, as illustrated by block 56. The compensated friction braking is then redistributed to wheels 22 via the friction braking system as shown in block 57. Additionally, the friction braking applied to wheels 22 may be modulated through the use of ABS module 34 as illustrated in block 58. Following block 58, block 60 occurs where the method returns to block 52.

As described in the foregoing, the powertrain braking is reduced by a predetermined amount and the friction braking is compensated and redistributed to the wheels of vehicle 12 through the use of a friction braking system having anti-lock braking functionality. It is recognized that vehicle 12 may be any vehicle configured to monitor and distribute powertrain braking and friction braking. As such, vehicle 12 may be a hybrid electric vehicle (HEV) or a fuel cell electric vehicle (FCEV). It is further recognized that vehicle 12 is configured to apply a braking force (e.g., friction braking and powertrain braking) that is independent of a braking request from brake pedal 30 or an acceleration/deceleration request from accelerator pedal 15, through the use of controller 38, an adaptive speed control system integrated with engine 14, and ABS module 34. Additionally, although vehicle 12 illustrates a braking system that utilizes hydraulics, the braking system of vehicle 12 may be a pure BBW system, an electromechanical braking system or a hydro-mechanical braking system.

Furthermore, although the embodiments herein, in some instances, have been described in the context of operating within the torque domain, it is recognized that the present invention may be utilized within an acceleration, power or force domain without departing from the scope of the present invention. Accordingly, while embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of braking a vehicle having multiple wheels, wherein the vehicle is configured to apply friction braking and powertrain braking to the vehicle, the method comprising:

reducing the powertrain braking by a predetermined amount;

compensating the friction braking in an amount that is substantially the same as the predetermined amount;

redistributing the friction braking to the multiple wheels; and modulating the friction braking being applied to the multiple wheels.

2. A method according to claim 1, further comprising:
  determining whether a wheel lockup event has occurred prior to or concurrently with reducing the powertrain braking by a predetermined amount; and
  reducing the powertrain braking by a predetermined amount when the wheel lockup event occurs.

3. A method according to claim 1, wherein modulating the friction braking being applied to the multiple traction wheels occurs through the use of an anti-lock braking system.

4. A method according to claim 1, wherein reducing the power train braking by a predetermined amount comprises:
  generating signals through the use of a controller for the powertrain to reduce the amount of powertrain braking produced or mechanically decoupling the powertrain from the wheels.

5. A method according to claim 1, further including applying friction braking in response to a braking request from a brake pedal.

6. A method according to claim 1 further including applying powertrain braking in response to a deceleration request for the engine to apply the powertrain braking.

7. A method according to claim 6, wherein applying powertrain braking in response to a the deceleration request includes a deceleration request that occurs when (i) no force is applied to an accelerator pedal or (ii) an amount of force applied to the accelerator pedal enables the vehicle to decelerate.

8. A method according to claim 1, further including configuring the vehicle to apply a braking torque independent of a braking request from a brake pedal.

9. A method according to claim 1, wherein compensating the friction braking includes adding braking torque to the friction braking in an amount that is substantially the same as the predetermined amount.

10. A braking system for a vehicle having multiple wheels comprising:
  a powertrain configured to apply powertrain braking to the vehicle;
  a friction braking system for applying friction braking to the vehicle;
  a controller operable with the powertrain for reducing the powertrain braking by a predetermined amount; and
  a braking module integrated with the friction braking system and operable with the controller for compensating the friction braking in an amount that is substantially the same as the predetermined amount and for redistributing the friction braking to the multiple wheels, and modulating the friction braking being applied to the multiple wheels, thereby reducing the occurrence of a wheel lockup by the multiple wheels.

11. A system according to claim 10, wherein the braking module is operable with the controller and the friction braking system for determining whether a wheel lockup event has occurred prior to or concurrently with reducing the powertrain braking by a predetermined amount.

12. A system according to claim 10, wherein the braking module is an anti-lock braking module.

13. A system according to claim 10, wherein the braking module being operable with the controller and the friction braking system redistributes the friction braking to the traction wheels includes redistributing the friction braking to four wheels of the vehicle.

14. A system according to claim 10, wherein the braking module being operable with the controller and the friction braking system for compensating the friction braking includes adding braking torque to the friction braking in an amount substantially the same as the predetermined amount.

15. A system according to claim 10, further including a brake pedal operable with the friction braking system for generating a braking request.

16. A system according to claim 10, wherein the controller is configured to receive a deceleration request for the powertrain to apply the powertrain braking to the vehicle.

17. A system according to claim 16, wherein the deceleration request occurs when no force is applied to an accelerator pedal or an amount of force applied to the accelerator pedal enables the vehicle to decelerate.

18. A system according to claim 10, wherein the friction braking system is configured to apply the friction braking that is independent of a braking request from a brake pedal.

19. A system according to claim 10, wherein the friction braking system is an electro-mechanical or a hydro-mechanical braking system.

20. A method of braking a hybrid electric vehicle (HEV) having multiple wheels, wherein the vehicle has a motor/generator and is configured to apply friction braking and powertrain braking to the vehicle, the method comprising:
  reducing the powertrain braking by a predetermined amount by generating signals, through the use of a controller, that are received by the motor/generator and/or an engine;
  adding friction braking torque to the friction braking in an amount that is substantially the same as the predetermined amount;
  redistributing the friction braking to the multiple wheels; and
  modulating the friction braking being applied to the multiple wheels.

* * * * *